(12) United States Patent
Kuiper et al.

(10) Patent No.: US 7,982,963 B2
(45) Date of Patent: \*Jul. 19, 2011

(54) LIQUID-BASED OPTICAL DEVICE AND ELECTRONIC DEVICE

(75) Inventors: Stein Kuiper, Vught (NL); Bernardus Hendrikus Wilhelmus Hendriks, Eindhoven (NL)

(73) Assignee: Koninklijke Philips Electronics, N.V., Eindhoven (NL)

( \* ) Notice: Subject to any disclaimer, the term of this patent is extended or adjusted under 35 U.S.C. 154(b) by 55 days.

This patent is subject to a terminal disclaimer.

(21) Appl. No.: 12/405,639

(22) Filed: Mar. 17, 2009

(65) Prior Publication Data
US 2009/0174948 A1    Jul. 9, 2009

Related U.S. Application Data

(63) Continuation of application No. 10/599,865, filed on Oct. 12, 2006, now Pat. No. 7,525,736.

(30) Foreign Application Priority Data

Apr. 16, 2004 (GB) .................................. 0408479.4
Apr. 23, 2004 (GB) .................................. 0409159.1

(51) Int. Cl.
*G02B 1/06* (2006.01)

(52) U.S. Cl. ........................ 359/665; 359/666; 359/667

(58) Field of Classification Search ........... 359/665–667
See application file for complete search history.

(56) References Cited

U.S. PATENT DOCUMENTS

| 5,373,102 A * | 12/1994 | Ehrlich et al. ................. 174/381 |
| 6,369,954 B1 * | 4/2002 | Berge et al. .................... 359/666 |
| 2001/0017985 A1 | 8/2001 | Tsuboi et al. |

FOREIGN PATENT DOCUMENTS

| EP | 0713240 A2 | 5/1996 |
| WO | 03069380 A1 | 8/2003 |
| WO | 2004102250 A1 | 11/2004 |

\* cited by examiner

*Primary Examiner* — Joseph Martinez

(57) ABSTRACT

The present invention discloses an optical device comprising a container enclosing an insulating liquid (A) and a liquid responsive to an electric field (B), the insulating liquid (A) and the liquid responsive to an electric field (B) being immiscible and being in contact with each other via an interface (14), at least one of the liquids (A; B) being at least partially placed in a light path through the container. The optical device further comprises an electrode arrangement (2; 12) for controlling the shape of the interface (14) by means of a voltage; and means (100) for preventing the interface from an exposure to an external electric field. Consequently, the build-up of electrostatic charge on a surface of the optical device is avoided, which prevents the unwanted distortion of the interface (14) caused by the interaction of the liquid responsive to an electric field (B) and the electrostatic charge.

15 Claims, 3 Drawing Sheets

LIQUID-BASED OPTICAL DEVICE AND ELECTRONIC DEVICE

Figure 1:
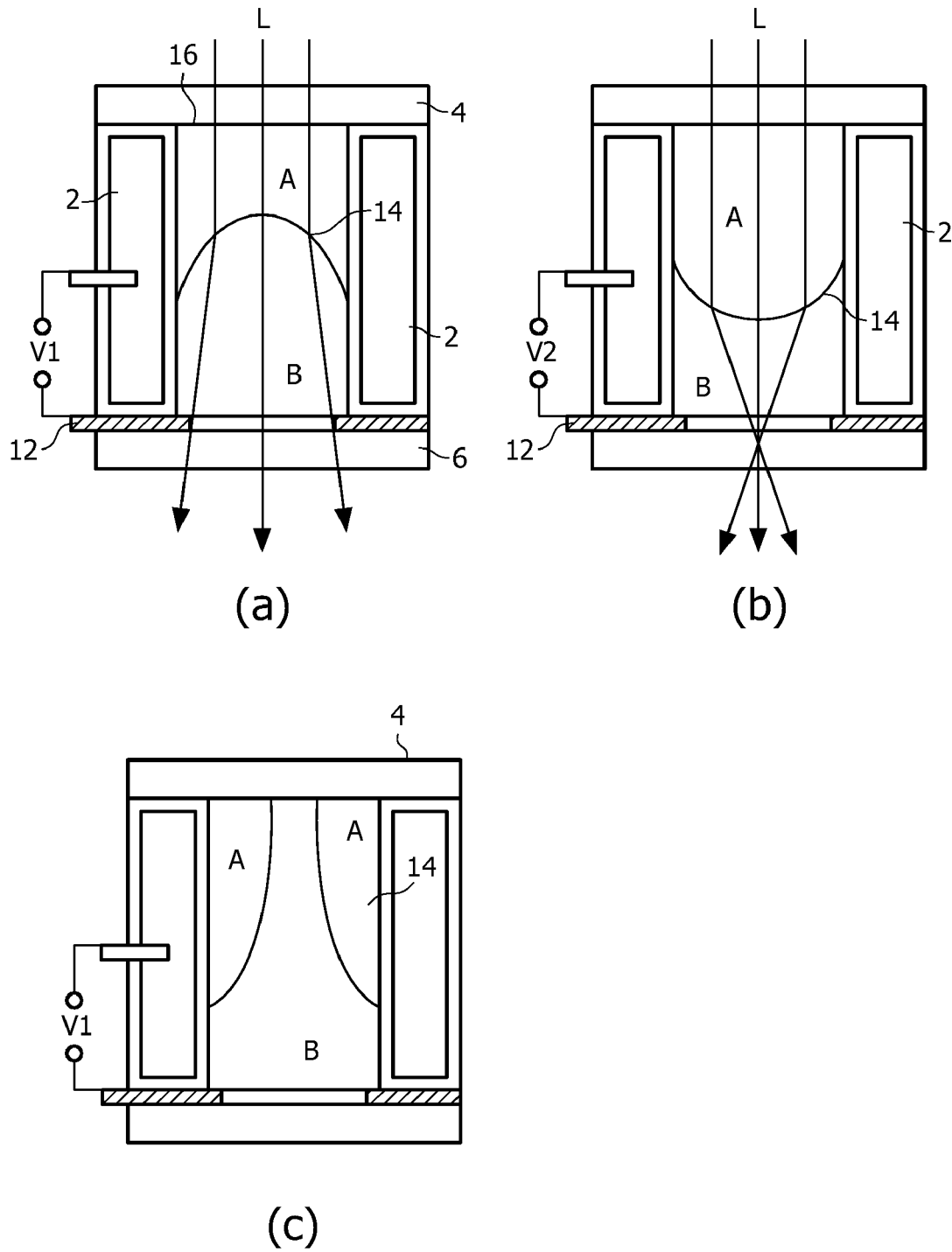

This is a continuation of prior application Ser. No. 10/599,865 filed Oct. 12, 2006 and is incorporated by reference herein.

The present invention relates to an optical device comprising a container enclosing an insulating liquid and a liquid responsive to an electric field, the insulating liquid and the liquid responsive to an electric field being immiscible and being in contact with each other via an interface, the liquids being placed in a light path through the container; an electrode arrangement for controlling the shape of the interface by means of a voltage.

The present invention further relates to an electronic device comprising such an optical device.

Optical devices based on the manipulation of liquids are rapidly gaining large commercial interest, not in the least because of their lack of mechanically moving parts and the relative simplicity of the devices, which makes the devices cheap and durable.

For instance, in US patent application US2001/0017985 an optical device is disclosed that incorporates two immiscible liquids with equal refractive indices but different transmittances, with one of the two liquids being conductive. By varying the interface between these two liquids, the amount of each of the liquids in the light path through the device is changed and a diaphragm is obtained as a result.

International patent application WO03/069380 discloses a cylindrical variable focus lens incorporating two immiscible fluids having different refractive indices, one of the fluids being conductive and the other being insulating. The shape of the interface between the two fluids is manipulated by applying a voltage across the lens, which can be used to introduce a change in the focal point of the lens. The walls of the cylinder and one of the transparent lids of the cylinder are coated with a hydrophobic coating to ensure that at least in a switched off state the conductive fluid, which typically is a polar liquid, the contact area between said walls and the conductive fluid is minimized in order to achieve an interface with a large curvature, which contributes to a large optical power range for the lens.

A problem that can occur with such devices is that after a period of time an unintended deformation of the interface can occur, which disturbs the desired optical behaviour of the interface.

The invention seeks to provide an optical device in which the unintended deformation of the interface is avoided.

The invention further seeks to provide an electronic device comprising such an improved optical device.

According to an aspect of the invention, there is provided an optical device comprising a container enclosing an insulating liquid and a liquid responsive to an electric field, the insulating liquid and the liquid responsive to an electric field being immiscible and being in contact with each other via an interface, at least one of the liquids being at least partially placed in a light path through the container; means for controlling an orientation of the interface; and means for preventing the interface from an exposure to an external electric field.

In the context of the present invention, the phrase 'a liquid responsive to an electric field' is intended to include conductive liquids, polar liquids and polarizable liquids.

The invention is based on the realization that the unintended deformation of the interface is caused by its exposure to an external electric field, which may be a static field caused by the build-up of an electrostatic charge on a surface of the container. The build-up of the electrostatic charge may for instance be caused by intentional or unintentional rubbing of the surface of the container.

The means for controlling an orientation of the interface may comprise an electrode arrangement for controlling the shape of the interface by means of a voltage. This is especially advantageous in the case of the optical device being a variable focus lens, because this facilitates a lens with a large optical power.

In an embodiment, the surface is a part of a transparent end portion of the container, the means for preventing the interface from an exposure to an external electric field comprise a conductive layer, the conductive layer forming a part of the transparent end portion. This has the advantage that the accumulation of electrostatic charge on the transparent end portion can be avoided.

Advantageously, the electrode arrangement comprises an electrode in contact with the liquid responsive to an electric field, the conductive layer being conductively coupled to said electrode. In this embodiment, the conductive layer is kept at the same potential as the liquid responsive to an electric field, thus ensuring that the presence of any electrostatic charge on the transparent end portion has no influence on the shape of the interface.

In a further embodiment, the means for preventing the interface from an exposure to an external electric field comprise a Faraday cage surrounding the container. This embodiment, which may be combined with the previous embodiment, protects the optical device from exposure to external electrical fields, and consequently prohibits the build-up of electrostatic charge on a surface of its container.

The Faraday cage may comprise a conductive coating at least partially covering a further container. This has the advantage that the Faraday cage can be produced separately from the optical device.

The further container may be at least partially transparent. This has the advantage that the further container can completely encapsulate the container of the optical device, without the optical path through the latter being compromised.

According to a further aspect of the invention, there is provided an electronic device including an optical device comprising a container enclosing an insulating liquid and a liquid responsive to an electric field, the insulating liquid and the liquid responsive to an electric field being immiscible and being in contact with each other via an interface, at least one of the liquids being at least partially placed in a light path through the container; means for controlling an orientation of the interface; and means for preventing the interface from an exposure to an external electric field; the electronic device further comprising driver circuitry coupled to the means for controlling an orientation of the interface and a power supply for powering the driver circuitry, the means for preventing the interface from an exposure to an external electric field being coupled to a terminal of the power supply.

The electronic device of the present invention has the advantage that the performance of its optical device is not hampered by external electric fields such as the accumulation of electrostatic charges on a surface of the container of the optical device.

In an embodiment, the means for preventing the interface from an exposure to an external electric field are coupled to a terminal of the power supply, preferably ground, to ensure that said means are kept on a same potential as the liquid responsive to an electric field.

In an alternative embodiment, the means for preventing the interface from an exposure to an external electric field form a part of an arrangement for shielding an electronic circuit of the electronic device from external radiation. This has the advantage that the optical device can be protected from the build-up of electrostatic charge by extending an arrangement already present in the electronic device, which is cost-effective.

Figure 2:
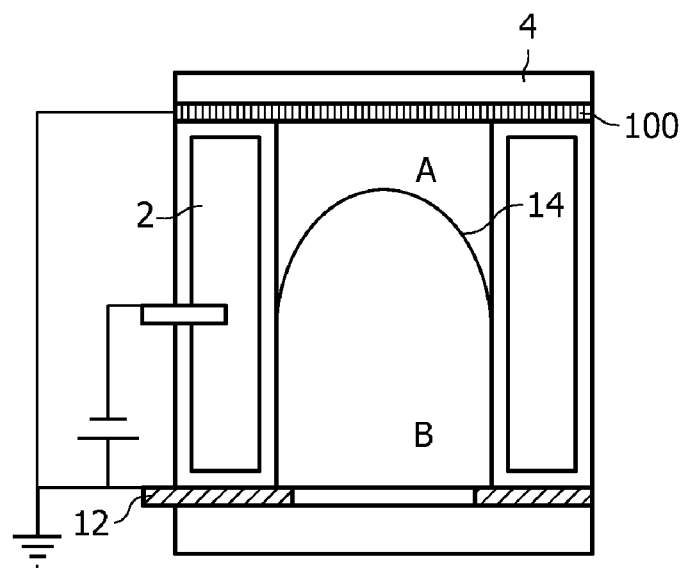
Figure 3:
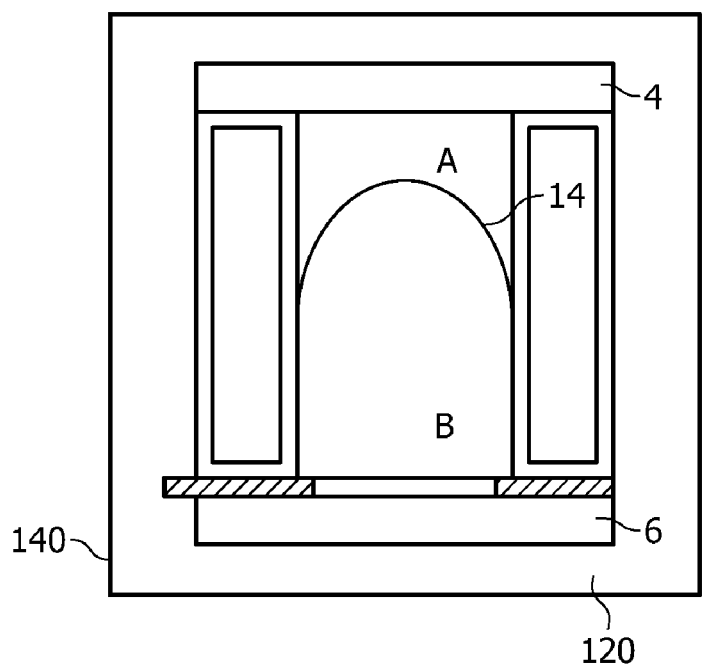
Figure 4:
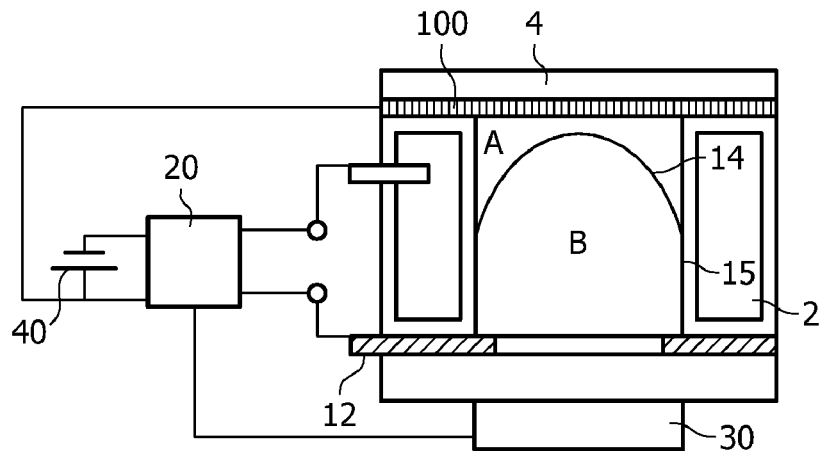
Figure 5:
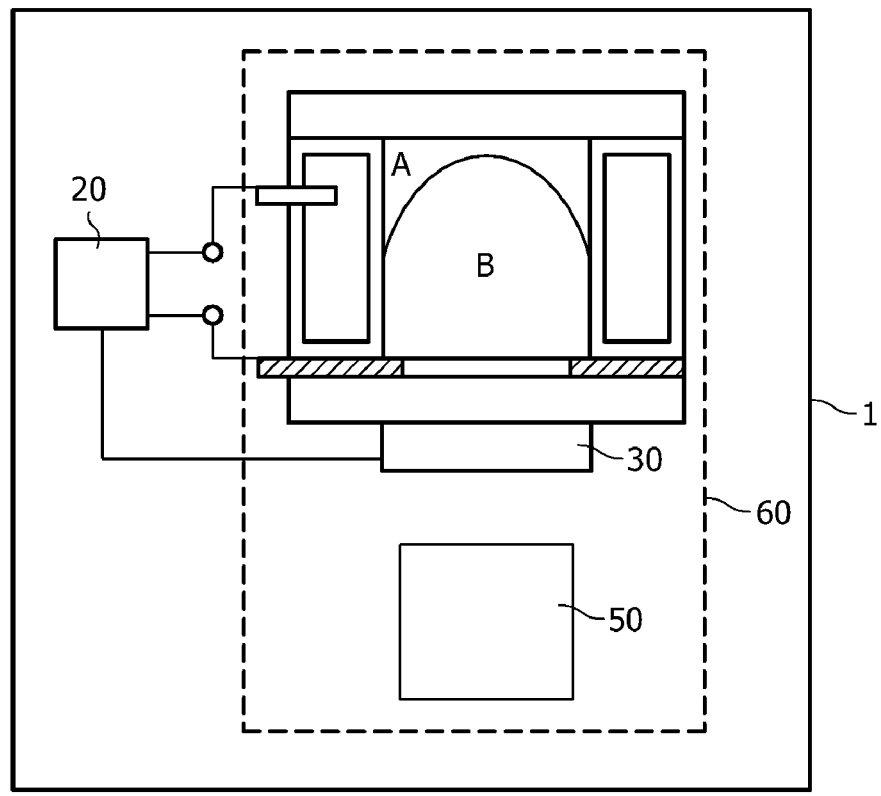

The invention is described in more detail and by way of non-limiting examples with reference to the accompanying drawings, wherein:

FIG. 1 schematically depicts a prior art variable focus lens;

FIG. 2 schematically depicts an optical device according to the present invention;

FIG. 3 schematically depicts another optical device according to the present invention;

FIG. 4 schematically depicts an electronic device according to the present invention; and FIG. 5 schematically depicts another electronic device according to the present invention.

It should be understood that the Figures are merely schematic and are not drawn to scale. It should also be understood that the same reference numerals are used throughout the Figures to indicate the same or similar parts.

In FIG. 1, a variable focus lens as disclosed in International Patent application WO 03/069380 is shown. The variable focus lens comprises a first fluid A and a second fluid B housed in a cylindrical chamber. The fluids are immiscible, have different refractive indices and preferably have the same density to avoid orientation-dependent gravitational effects on the orientation of the fluids including the interface 14 between the fluids. The cylindrical chamber further comprises a first end portion 4 and a second end portion 6, with the first end portion 4 as well as the inner walls of the cylindrical chamber being covered by a hydrophobic coating such as AF1600™ from the DuPont company, which may be combined with a stack of parylene, to confine the conductive fluid B by the insulating fluid A in the absence of an applied voltage. The shape of the interface 14 can be switched in a continuous fashion from a convex shape shown in orientation (a) to a concave shape shown in orientation (b) by varying a direct or alternating voltage from a value V1 to a value V2 across the cylindrical electrode 2 embedded in the chamber wall and a, preferably transparent, annular electrode 12 on the second lid 6 which is in conductive contact with the second fluid B. Consequently, the focal point of the light path L through the cylinder is altered.

The transparent end portion 4 may be a glass or polymer lid or another suitable transparent material, which may be lens-shaped. The exposure of the container of the fluids A and B to an external electrical field or the rubbing of the transparent end portion 4, e.g., cleaning the end portion with a cloth or accidental rubbing of the end portion 4 by wearing the optical device in a pocket of a garment, can cause the accumulation of an electrostatic charge on a surface of the container such as the transparent end portion 4. This charge can attract the conductive fluid B, thereby disturbing the shape of the interface 14 between the fluids A and B, as shown in (c), thus causing a deviation of the desired optical behaviour of the lens. Since it can take several hours or longer for the electrostatic charge to leak away, it will be obvious that this is a highly unwanted effect. It is pointed out that a similar unwanted effect can occur when the lens is exposed to an external electrical field.

It is emphasized that although this undesirable effect is explained using the prior art lens from International Patent application WO 03/069380 as an example, other liquid-based optical devices such as the diaphragm disclosed in US patent application US2001/0017985 can equally suffer from this problem.

In FIG. 2 and the following figures, the variable focus lens of FIG. 1 will be shown as an embodiment of the optical device of the present invention. It is emphasized, however, that the teachings of the present invention also apply to other liquid-based optical devices. In FIG. 2, the variable focus lens of FIG. 1 is extended with a conductive layer 100 for preventing the interface from an exposure to an external electric field of the lens, i.e., on the first end portion 4. The conductive layer 100 is shown on the inner surface of the end portion 4, but an orientation on the outer surface of the end portion 4 is also feasible. The conductive layer 100 can be realized with any known transparent conductive material such as indium tin oxide (ITO), Indium trioxide ($In_2O_3$) or tin dioxide ($SnO_2$). Preferably, the conductive layer 100 is kept at the same potential as the liquid responsive to an electric field B, which can be realized by conductively coupling the conductive layer 100 to the electrode 12 in contact with the liquid responsive to an electric field B, as shown in FIG. 2.

FIG. 3 shows another embodiment of an optical device of the present invention. The variable focus lens of FIG. 1 is placed inside a further container 120. The further container 120 may be open opposite the end portion 4 and the end portion 6 of the variable focus lens, or may have transparent sections opposite those end portions. The further container 120 may further comprise a metal body, or may further comprise a non-conductive material such as plastic or glass, which may be transparent. In case of the further container 120 comprising such a non-conductive material, the further container 120 further comprises a conductive coating 140, which may be transparent, and which may reside on an inner surface or an outer surface of the further container 120.

Consequently, the further container 120 acts as a Faraday cage around the variable focus lens, thus preventing a build-up of an electrostatic charge on a surface of the container. Furthermore, since an external electrical field can also disrupt the intended optical behaviour of the optical device, the Faraday cage also protects the optical device against such disruptions. The conductive coating 140 may also be applied to the outer surface of the container of the variable focus lens, in which case the further container 120 can be omitted. Preferably, the conductive coating 140 or a conductive further container 120 are conductively coupled to the liquid responsive to an electric field B to ensure that the Faraday cage is kept at the same potential as the liquid responsive to an electric field B. This conductive coupling may be realized via the electrode 12. It is emphasized that the aforementioned embodiments of a Faraday cage may be combined with any of the embodiments of the conductive layer 100 as shown in FIG. 2 without departing from the scope of the present invention.

At this point, it is emphasized that although in this application the means for controlling the orientation of the interface 14 are depicted as an electrode arrangement for controlling the shape of the interface 14 by means of a voltage, other means for controlling the orientation of the interface 14 are equally acceptable, such as the means for controlling the orientation of the interface 14 as described in unpublished European patent application 03101335.2 with priority date May 14, 2003.

In this application, a variable focus lens is disclosed including two immiscible liquids with different refractive indices. The lens has two chambers over which the two liquids are distributed: a first chamber in which the interface is positioned and through which the light path runs, and a second chamber having two connections to the first chamber. The second chamber includes a pump, which is used to alter the respective volumes of the liquids in both chambers. Consequently, the focus of the lens is varied by a translation of the position of the interface between the two liquids with respect to the inner wall of the first chamber rather than by changing the shape, i.e., the curvature of the interface.

FIG. 4 shows an embodiment of an electronic device 1 of the present invention, including an optical device having a conductive layer 100 on the end portion 4, as shown in FIG. 2 and its detailed description. The electronic device 1 further includes driver circuitry 20 for applying a voltage across the electrode arrangement including electrodes 2 and 12, and an image sensor 30 for capturing an image that enters the electronic device 1 via the light path of the optical device. The driver circuitry 20 and the image sensor 30 are powered by a power supply 40, which has one of its terminals, e.g., ground, coupled to the conductive layer 100. This may also be the ground of the electronic device 1. Alternatively, the conductive layer 100 may also be coupled to the power supply 40 via the electrode 12, in an arrangement analogous to that shown in FIG. 2.

FIG. 5 shows another embodiment of an electronic device 1 of the present invention, including a liquid-based optical device, e.g., a variable focus lens, driver circuitry 20, an image sensor 30 and a power supply (not shown). The electronic device 1 further comprises an electronic circuit 50, which is shielded from external radiation, i.e., radiation from outside the electronic circuit, by shielding material 60. The shielding material 60 may be any suitable material known to the skilled person, e.g., a conductive foil or a metal housing. The shielding material 60 is extended over the container of the optical device without blocking the light path through the optical device to prevent a build-up of an electrostatic charge on a surface of the container of the optical device.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. An optical device comprising:
    a container enclosing an insulating liquid and a liquid responsive to an electric field, the insulating liquid and the liquid responsive to an electric field being immiscible and being in contact with each other via an interface, at least one of the liquids being at least partially placed in a light path through the container;
    means for controlling an orientation of the interface; and
    means for preventing the interface from an exposure to an external electric field.

2. An optical device as claimed in claim 1, wherein the means for controlling an orientation of the interface comprise an electrode arrangement for controlling the shape of the interface by means of a voltage.

3. An optical device as claimed in claim 1, wherein a surface is a part of a transparent end portion of the container; the means for preventing the interface from an exposure to an external electric field comprise a conductive layer, the conductive layer forming a part of the transparent end portion.

4. An optical device as claimed in claim 3, wherein the means for controlling the orientation of the interface comprise an electrode in contact with the liquid responsive to an electric field, the conductive layer being conductively coupled to said electrode.

5. An optical device as claimed in claim 1, wherein the means for preventing the interface from an exposure to an external electric field comprise a Faraday cage surrounding the container.

6. An optical device as claimed in claim 5, wherein the Faraday cage comprises a conductive coating at least partially covering a further container.

7. An optical device as claimed in claim 6, wherein the further container is at least partially transparent.

8. An electronic device as claimed in claim 7, wherein the means for preventing the interface from an exposure to an external electric field are coupled to a terminal of the power supply.

9. An optic device as claimed in claim 1, wherein the means for preventing the interface from an exposure to an external electric field form a part of an arrangement for shielding an electronic circuit of the electronic device from external radiation.

10. An optic device of claim 1, wherein the means for preventing the interface from an exposure to an external electric field is an opaque conductive shield with openings for the light path.

11. An electronic device including an optical device comprising:
    a container enclosing an insulating liquid and a liquid responsive to an electric field, the insulating liquid and the liquid responsive to an electric field being immiscible and being in contact with each other via an interface, at least one of the liquids being at least partially placed in a light path through the container;
    means for controlling an orientation of the interface; and
    means for preventing the interface from an exposure to an external electric field;
    driver circuitry coupled to the means for controlling an orientation of the interface; and
    a power supply for powering the driver circuitry.

12. An electronic device as claimed in claim 11, wherein said terminal is the ground.

13. An electronic device as claimed in claim 11, wherein the means for preventing the interface from an exposure to an external electric field form a part of an arrangement for shielding an electronic circuit of the electronic device from external radiation.

14. An electronic device of claim 8, wherein the means for preventing the interface from an exposure to an external electric field is an opaque conductive shield with openings for the light path.

15. An optical device comprising:
    a container enclosing an insulating liquid and a liquid responsive to an electric field, the insulating liquid and the liquid responsive to an electric field being immiscible and being in contact with each other via an interface, at least one of the liquids being at least partially placed in a light path through the container;
    means for controlling an orientation of the interface; and
    means for preventing the interface from an exposure to an external electric field;
    wherein a surface is a part of a transparent end portion of the container; the means for preventing the interface from an exposure to an external electric field comprise a conductive layer, the conductive layer forming a part of the transparent end portion; and
    the means for controlling the orientation of the interface comprise an electrode in contact with the liquid responsive to an electric field, the conductive layer being conductively coupled to said electrode.

* * * * *